(12) United States Patent
Faibish et al.

(10) Patent No.: US 9,710,190 B1
(45) Date of Patent: Jul. 18, 2017

(54) SHARED MEMORY

(71) Applicant: EMC Corporation, Hopkinton, MA (US)

(72) Inventors: Sorin Faibish, Newton, MA (US);
John M. Bent, Los Alamos, NM (US);
James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 14/502,555

(22) Filed: Sep. 30, 2014

(51) Int. Cl.
*G06F 15/167* (2006.01)
*G06F 3/06* (2006.01)

(52) U.S. Cl.
CPC .......... *G06F 3/0656* (2013.01); *G06F 3/0604* (2013.01); *G06F 3/067* (2013.01); *G06F 2003/0697* (2013.01)

(58) Field of Classification Search
USPC ................ 709/213, 214, 215, 216, 218, 219
See application file for complete search history.

(56) References Cited

U.S. PATENT DOCUMENTS

| | | | | |
|---|---|---|---|---|
| 2008/0270825 | A1* | 10/2008 | Goodson | G06F 11/1471 714/5.11 |
| 2010/0106921 | A1* | 4/2010 | Glasco | G06F 12/10 711/154 |
| 2013/0198450 | A1* | 8/2013 | Malwankar | G06F 3/0607 711/114 |
| 2016/0080491 | A1* | 3/2016 | Sykes | H04L 67/1097 709/219 |

\* cited by examiner

*Primary Examiner* — Lan-Dai T Truong
(74) *Attorney, Agent, or Firm* — Krishnendu Gupta; Konrad R. Lee

(57) ABSTRACT

A computer-executable method, computer program product, and system for managing I/Os from an Application on a host, wherein the host is in communication with a data storage system including one or more burst buffer servers, the computer-executable method, computer program product, and system comprising providing a portion of shared memory using the one or more burst buffer servers of the data storage system, wherein the portion of shared memory is enabled to be visible from each of the one or more burst buffer servers, receiving, at a first burst buffer server of the one or more burst buffer servers, a data I/O request from the application on the host, wherein the data I/O request is associated with data on the portion of shared memory, determining whether data associated with the data I/O request is located on the first buffer server, and processing the data I/O request based on the determination.

20 Claims, 10 Drawing Sheets

SHARED MEMORY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, computer program product, and system for managing I/Os from an Application on a host, wherein the host is in communication with a data storage system including one or more burst buffer servers, the computer-executable method, computer program product, and system comprising providing a portion of shared memory using the one or more burst buffer servers of the data storage system, wherein the portion of shared memory is enabled to be visible from each of the one or more burst buffer servers, receiving, at a first burst buffer server of the one or more burst buffer servers, a data I/O request from the application on the host, wherein the data I/O request is associated with data on the portion of shared memory, determining whether data associated with the data I/O request is located on the first buffer server, and processing the data I/O request based on the determination.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
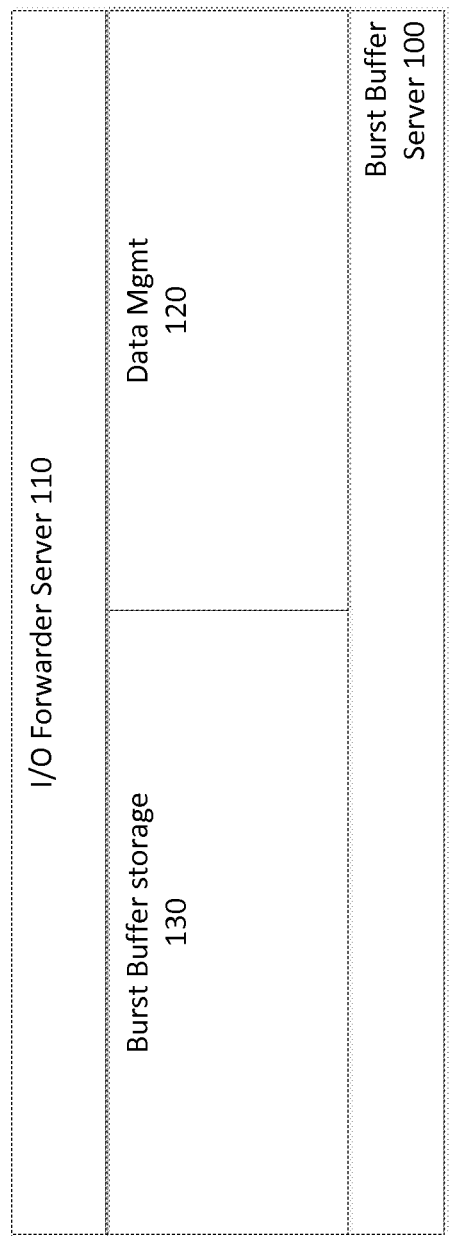
FIG. 1 is a simplified illustration of a burst buffer server enabled to provide shared memory in a data storage system, in accordance with an embodiment of the present disclosure.

Traditionally, Burst buffers have only been used for the purpose of accelerating the I/O traffic from Compute Nodes to Parallel File Systems (PFS) in a super computer without any guarantees for the consistency of the data between the burst buffer nodes. Conventionally, there was no guarantee that the data in the burst buffer was recoverable in the case of a burst buffer node failure. Typically, burst buffers maintain data consistency using parallel file systems (mainly Lustre) for communication and maintaining synchronizations throughout the data storage systems. Generally, a failure of the Parallel File system means an irrecoverable loss of all data on the burst buffer. Conventionally, enabling a burst buffer to overcome a Parallel File System failure and maintain consistency would be beneficial to the data storage industry.

In many embodiments, the current disclosure may enable a data storage system to provide shared memory to one or more compute nodes. In various embodiments, the current disclosure may enable a data storage system to provide consistent data storage to one or more compute nodes. In certain embodiments, the current disclosure may enable a data storage system to provide redundant data storage to one or more compute nodes.

In most embodiments, a data storage system may include two or more burst buffer nodes. In various embodiments, a burst buffer node may include an I/O Forwarder Server, data management module, and fast non volatile data storage. In certain embodiments, a burst buffer node may be enabled to communicate with other burst buffer nodes to ensure data consistency among two or more burst buffer nodes. In some embodiments, a data storage system including burst buffer nodes may be enabled to provide data redundancy such that data may be recovered from a failed burst buffer node using one or more other burst buffer nodes in a data storage system. In many embodiments, a burst buffer may be enabled to communicate with and/or manage one or more data storage arrays. In various embodiments, a burst buffer may be enabled to manage a file, block, and/or object storage. In certain embodiments, a data management module on a burst buffer may be enabled to implement one or more different types of file systems on the burst buffer.

In most embodiments, two or more burst buffer nodes may be enabled to provide shared memory to one or more compute nodes. In various embodiments, a compute node in communication with a burst buffer node providing shared memory may be enabled to access data stored within any burst buffer node within the shared memory. In certain embodiments, each burst buffer within shared memory may provide the same view of the shared memory as each other burst buffer within the shared memory. In some embodiments, each burst buffer node may be enabled to communicate with other burst buffers providing shared memory to determine at which point data consistency is reached. In most embodiments, data consistency may mean that data stored within shared memory is in a stable state.

In many embodiments, an I/O forwarding server may be enabled to use multiple burst buffers servers in a cluster configuration to create shared memory consistent across all Burst buffer servers. In various embodiments, an I/O Forwarding server may enable synchronization of I/O operations by using consistent I/O forwarding at the compute node. In most embodiments, data coherence may be achieved by utilizing I/O Dispatcher modules running on the burst buffer nodes which may be enabled to ensure that received I/O may be processed and/or each received I/O may be forwarded to another burst buffer where the target memory may have been located.

In most embodiments, Burst buffer servers may be enabled to execute data protection techniques that may enable each burst buffer node to be redundantly protected. In various embodiments, if a single burst buffer server fails, other burst buffer servers may be enabled to reproduce the data lost and therefore may enable recovery of failed data storage, which may not have been possible with loosely coupled burst buffer servers. In most embodiments, the current disclosure may enable one or more compute nodes to share all the memory and/or flash of all burst buffer servers combined into a single shared memory.

Refer to the example embodiment of FIG. 1. FIG. 1 is a simplified illustration of a burst buffer server enabled to provide shared memory in a data storage system, in accordance with an embodiment of the present disclosure. As shown, Burst buffer server 100 includes I/O Forwarder server 100, data management module 120, and burst buffer storage 130. Burst buffer server 100 is enabled to communicate with other nodes within a data storage system, including, but not limited to, one or more data storage arrays, one or more other burst buffer servers, and one or more compute nodes. I/O forwarder server 110 is enabled to receive read and write I/O requests from one or more compute nodes. I/O Forwarder 110 is enabled to asynchronously process I/O requests. Data management module 120 is enabled to manage a file system implemented on burst buffer storage 130 and any data storage device and/or array in communication with burst buffer server 100.

Figure 2:
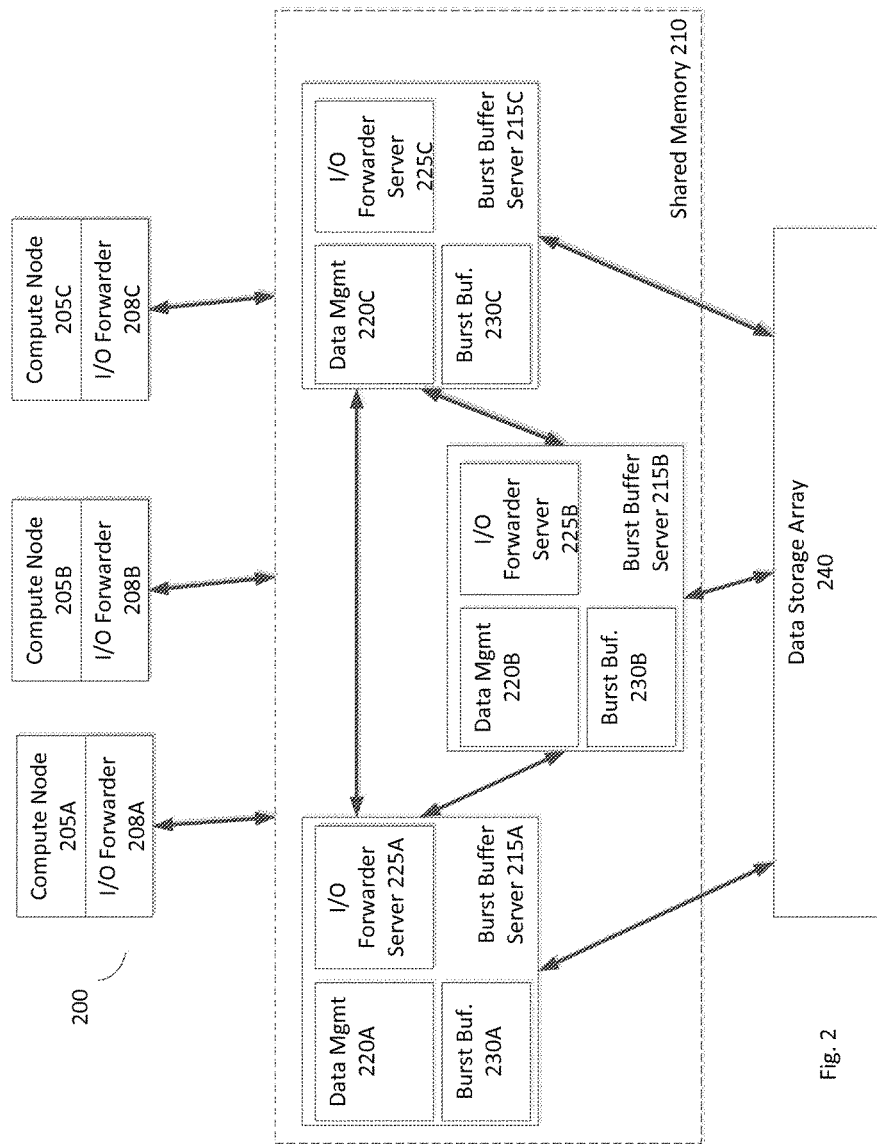
FIG. 2 is a simplified illustration of multiple compute nodes utilizing shared memory, in accordance with an embodiment of the present disclosure.

Refer to the example embodiment of FIG. 2. FIG. 2 is a simplified illustration of multiple compute nodes utilizing shared memory, in accordance with an embodiment of the present disclosure. Data storage system 200 includes burst buffer servers (215A-C, 215 Generally) and data storage array 240. Burst buffer server 215A includes I/O forwarder server 225A, Data management module 220A, and Burst Buffer 230A. Burst Buffer Server 215B includes I/O Forwarder server 225B, data management module 220B, and Burst Buffer 230B. Burst buffer server 215C includes I/O forwarder server 225C, data management module 220C, and Burst Buffer 230C. Shared memory 210 is a logical representation of Burst buffer server 215A, burst buffer server 215B, and Burst Buffer server 215C. Any compute node in communication with Burst Buffer 215A, Burst buffer server 215B, or Burst Buffer server 215C is enabled to see shared memory 210, which is a logical representation of data storage within Burst buffers 215. Compute nodes (205A-C, 205 Generally) are in communication with shared memory 210. If compute nodes 205 are in communication with burst buffer 215A, burst buffer server 215B, or burst buffer server 215C, compute nodes 205 will see shared memory 210. Compute node 205A includes I/O forwarder client 208A. Compute node 205B includes I/O Forwarder client 208B. Compute node 205C includes I/O forwarder client 208C.

In many embodiments, each burst buffer server comprising a shared memory may be enabled to receive read and write I/O requests from compute nodes in communication with a burst buffer server. In various embodiments, multiple burst buffer servers may be enabled to provide data storage in the form of shared memory. In certain embodiments data stored within shared memory may be partitioned between the burst buffer servers that comprise the shared memory. In some embodiments, a first burst buffer server is enabled to forward data managed by a second burst buffer server to the second burst buffer server.

Figure 3:
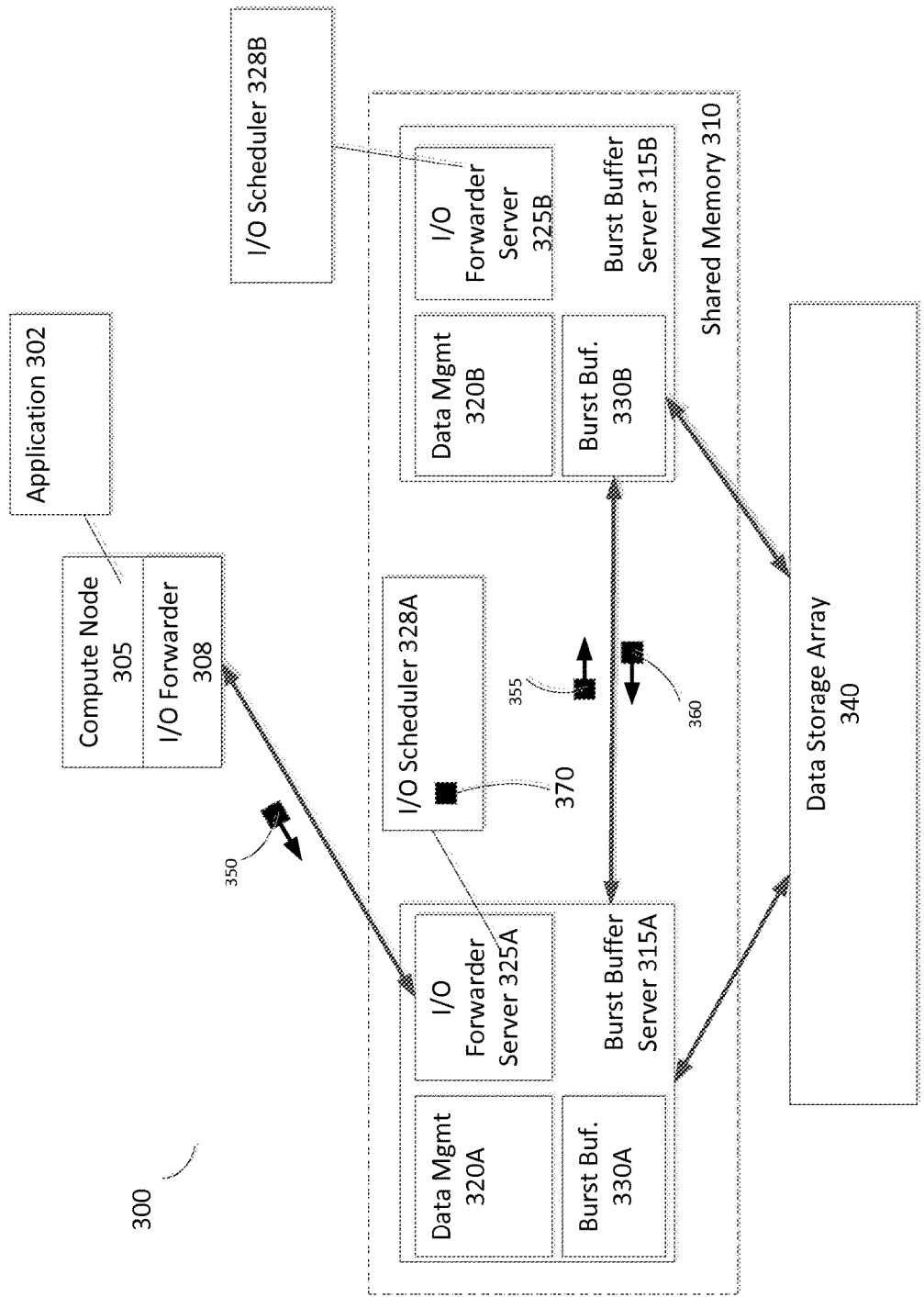
FIG. 3 is a simplified illustration of a compute node writing to shared memory provided by a data storage system, in accordance with an embodiment of the present disclosure.

Refer to the example embodiment of FIG. 3. FIG. 3 is a simplified illustration of a compute node writing to shared memory provided by a data storage system, in accordance with an embodiment of the present disclosure. Data storage system 300 includes burst buffer server 315A, Burst Buffer server 315B, and data storage array 340. Burst buffer server 315A and Burst buffer 315B comprise shared memory 310. Compute node 305 includes I/O Forwarder client 308 which enables compute node 305 to send read and/or write I/Os from application 302. Burst buffer server 315A includes I/O Forwarder Server 325A, Data management Module 320A, and Burst Buffer 330A. Burst Buffer server 315B includes I/O Forwarder Server 325B, Data management module 320B, and burst buffer 330B. Data storage array 340 is in communication with Burst Buffer server 315A and burst buffer server 315B.

In this embodiment, Application 302 is enabled to execute on compute node 305. Application 302 is enabled to send read and write I/O requests to shared memory 310 using I/O Forwarder client 308. Application 302 is enabled to send a write I/O request using message 350 to I/O Forwarder Server 325A. I/O Forwarder Server 325A is enabled to determine whether the write I/O request in message 350 is associated with data storage managed by Data management module 320A or whether the write I/O request in message 350 is associated with data storage managed by data management module 320B on Burst Buffer Server 315B. I/O Forwarder server 325A is enabled to forward received read and/or write I/O requests to Burst Buffer Server 315B if associated with data storage managed by Data management module 320B.

In this embodiments, I/O Forwarder server 325 determines that received write I/O request relates to data managed by Data management module 320A and queues the received I/O request in block 370 using I/O Scheduler 328A. I/O Forwarder server 325A sends an acknowledgement to application 302 to enable application 302 to continue execution if application 302 is using synchronous messaging. I/O Forwarder server 325A sends write I/O request to Data management module 320A which executes the write I/O Request. Periodically, I/O Forwarder server 325A sends message 355 to determine whether data managed by Data management module 320B is in a consistent state. I/O Forwarder server 325B queries Data management module 320B to determine if data is in consistent state. I/O Forwarder server 325B responds to message 355 using message 360.

Figure 4:
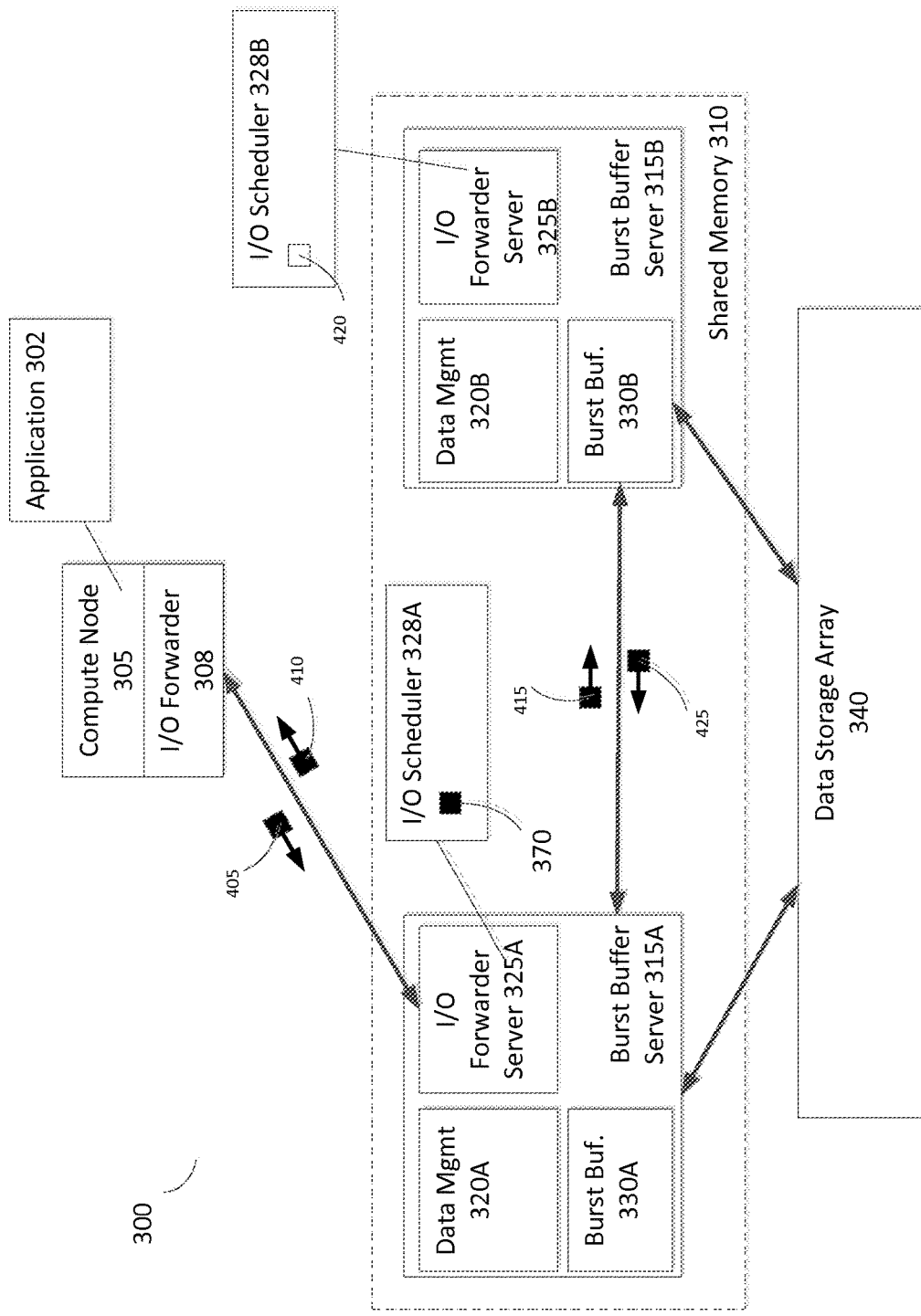
FIG. 4 is a simplified illustration of a compute node making a read I/O request to shared memory in a data storage system, in accordance with an embodiment of the present disclosure.

Refer to the example embodiments of FIG. 4. FIG. 4 is a simplified illustration of a compute node making a read I/O request to shared memory in a data storage system, in accordance with an embodiment of the present disclosure. Application 302 is executing on compute node 305A and sends a read I/O request to I/O Forwarder server 325A, via I/O forwarder client 308, using message 405. I/O Forwarder server 325 determines that data requested by the received I/O read request is managed by data management module 320B. I/O Forwarder server 325A sends message 415 to I/O forwarder Server 325B to prefetch the read I/O request. I/O forwarder server 325B queues the read I/O request in I/O scheduler 328B in block 420. I/O Forwarder server 325B sends data I/O read request in block 420 to data management module 320B to execute the data I/O read request. Upon receiving the request I/O, I/O forwarder server 325B sends the requested I/O to I/O Forwarder Server 325A in message 425. I/O Forwarder Server 325 caches requested I/O on burst buffer server 315A using data management module 320A. I/O Forwarder server 325A responds to application 302 with the requested data I/O in message 410.

Figure 5:
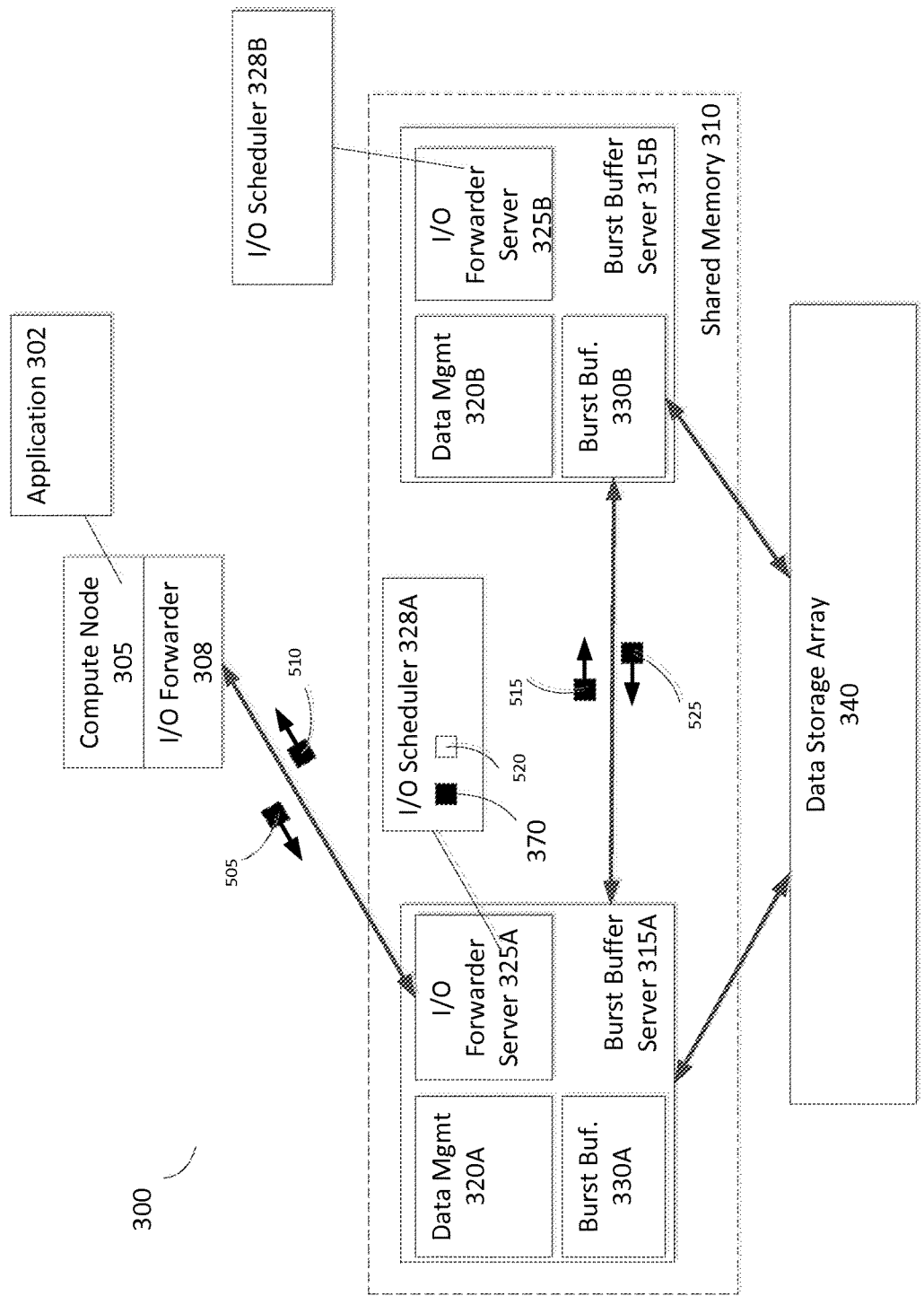
FIG. 5 is an alternative simplified illustration of a compute node sending a read I/O request to shared memory, in accordance with an embodiment of the present disclosure.

Refer to the example embodiment of FIG. 5. FIG. 5 is an alternative simplified illustration of a compute node sending a read I/O request to shared memory, in accordance with an embodiment of the present disclosure. Compute node 305 is executing application 302. Application 302 sends a data I/O read request to shared memory 310 in message 505. Shared memory 310 is enabled to be made visible to application 302 by communicating with either I/O forwarder server 325A or IO Forwarder server 325B. In this embodiment, Application 302 is in communication with I/O Forwarder server 325A. Application 302 uses I/O forwarder client 308 to send message 505 to I/O Forwarder server 325A.

In this embodiment, I/O forwarder server 325A receives read I/O request from compute node 305 in message 505. I/O forwarder server 325A determines that data associated with message 505 is managed by data management module 320A. I/O forwarder server 325A queues data I/O read request within message 505 in block 520 in I/O Scheduler 328A. I/O forwarder client 308 sends message 505 to I/O forwarder server 325B to query whether or not data is consistent across each burst buffer in shared memory 310. I/O forwarder server 325A analyzes blocks in I/O scheduler 328A to determine whether data consistency exists on burst buffer server 315A. I/O forwarder server 325A determines that write I/O request in block 370 must be executed before the read I/O request in block 520. I/O forwarder server 325A sends write I/O request in block 370 to data management module 320A to be executed. Upon determination of data consistency, I/O forwarder server 325A sends read I/O request in I/O scheduler 328A to data manage module 320A to be completed. Upon completion, I/O forwarder server 325A sends requested data I/O to compute node 305 using message 510.

Figure 6:
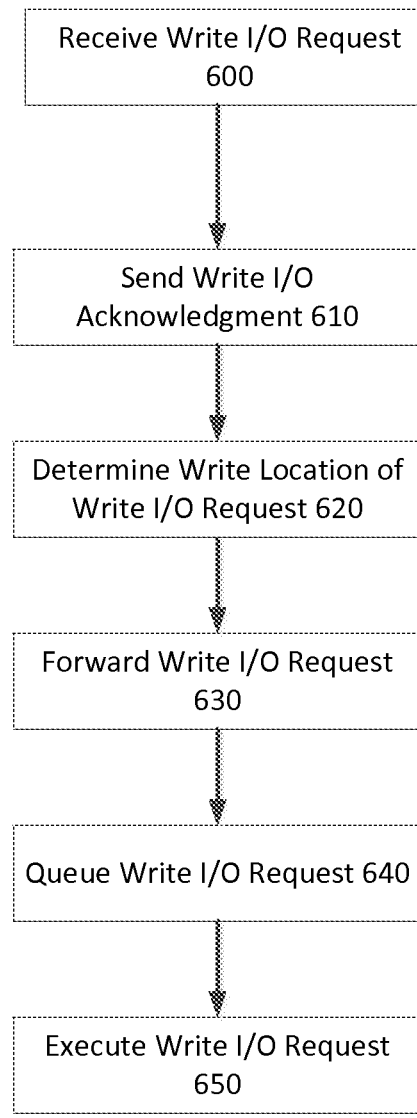
FIG. 6 is a simplified flowchart of processing a write I/O request from a compute node as shown in FIG. 3, in accordance with an embodiment of the present disclosure.

Refer to the example embodiments of FIGS. 3 and 6. FIG. 6 is a simplified flowchart of processing a write I/O request from a compute node as shown in FIG. 3, in accordance with an embodiment of the present disclosure. As shown in FIG. 3, I/O forwarder server 325A receives write I/O request in message 350 (Step 600) from application 302. Application 302 is executing on compute node 305. Application 302 uses I/O forwarder client 308 to send message 350 to I/O forwarder server 325A within Burst buffer server 315A. I/O forwarder server module 325A sends a write I/O acknowledgement (Step 610) to application 302 which enables Application 302 to continue executing, if executing using synchronous messaging. In many embodiments, if an application is operating asynchronously, the application may not need to wait for an acknowledgment from an I/O Forwarder server module. I/O Forwarder server 325A analyzes message 350 to determine the write location of write I/O request in message 350 (Step 620). If the write location is at Burst buffer server 315A, I/O forwarder server 325A schedules the write I/O request in block 370 using I/O Scheduler 328A (Step 640). I/O forwarder server 325A sends block 370 to data management Module 320A to execute the Write I/O request (Step 650). If the write location is at Burst Buffer server 315B, I/O forwarder server 325A sends the received write I/O Request to I/O forwarder server 325B using message 355 (Step 630) and I/O forwarder server 325B sends an acknowledgment to I/O Forwarder server 325A using message 360.

Figure 7:
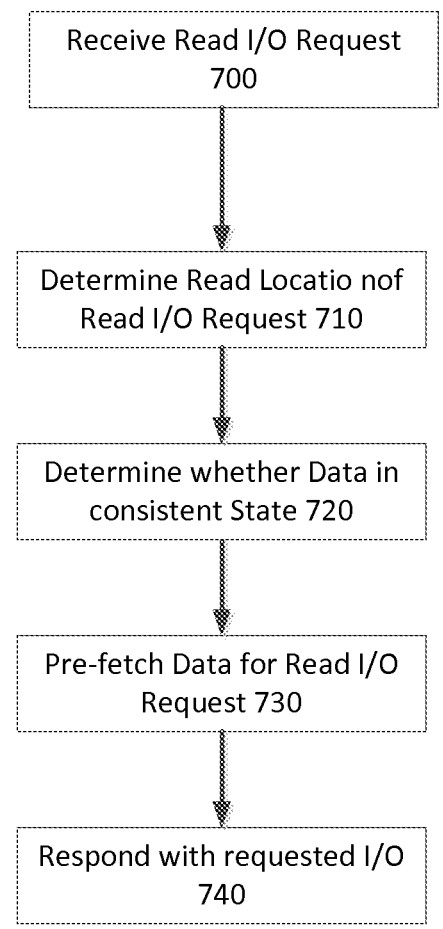
FIG. 7 is a simplified flowchart of a method of managing a read I/O request within the data storage system shown in FIG. 4, in accordance with an embodiment of the present disclosure.

Refer to the example embodiments of FIGS. 4 and 7. FIG. 7 is a simplified flowchart of a method of managing a read I/O request within the data storage system shown in FIG. 4, in accordance with an embodiment of the present disclosure. As shown in FIG. 4, I/O forwarder server 325A receives read I/O request (Step 700) from application 302 in message 405. I/O Forwarder server 325A determines the read location of read I/O Request (Step 710) and determines that the associated location is managed by Data management module 320B on burst buffer server 315B. I/O Dispatcher 325A determines whether data within shared memory 310 is in a consistent state (Step 720) and pre-fetches data requested by read I/O request (Step 730) using message 415. I/O forwarder server 325B retrieves requested data from data management module 320B and returns requested data within message 425. I/O forwarder server 325A sends a write request to data management module 320A to write the requested data to burst buffer server 315A and responds to the read I/O request in message 410 (Step 740).

Figure 8:
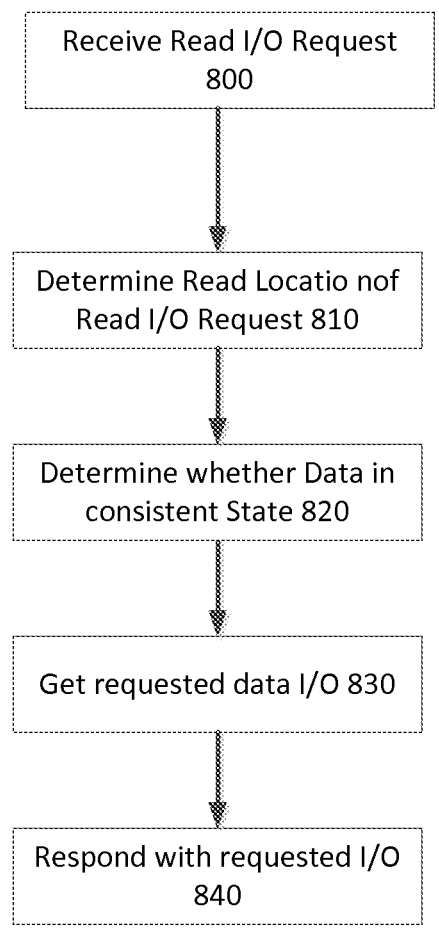
FIG. 8 is a simplified flowchart of a method of reading I/Os from shared memory provided by the data storage system of FIG. 5, in accordance with an embodiment of the present disclosure.

Refer to the example embodiment of FIGS. 5 and 8. FIG. 8 is a simplified flowchart of a method of reading I/Os from shared memory provided by the data storage system of FIG. 5, in accordance with an embodiment of the present disclosure. As shown in FIG. 5, application 302 is hosted on compute node 305. Application 302 sends a read I/O request (Step 800) to I/O forwarder server 325A in message 505 using I/O forwarder client 308. I/O forwarder server 325A determines the read location of the read I/O Request (Step 810) in message 505. I/O Forwarder server 325A determines that the read I/O request in message 505 is associated with data managed by data management module 320A. I/O forwarder server 325A queues received read I/O request from message 505 to block 520 in I/O scheduler 328A. I/O forwarder server 325A sends message 515 to I/O forwarder server 325B to determine whether data in shared memory 310 is in a consistent state (Step 820). I/O forwarder server 325B determines whether data stored within burst buffer server 315B is in a consistent state and responds in message 525 when a consistent state is reached. I/O forwarder server 325A analyzes I/O scheduler 328A and determines that write I/O request 370 needs to be completed before data is consistent on burst buffer server 315A. I/O forwarder server 325A sends write I/O request in block 370 to data management module 320 to be completed. I/O forwarder server 325A sends the data I/O request in block 520 to data management module 320 to get requested data I/O (Step 830). Once requested data I/O is received, I/O forwarder server 325A responds to application 302 on compute node 305 using message 510 (Step 840). As shown, message 510 contains the requested data I/O.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
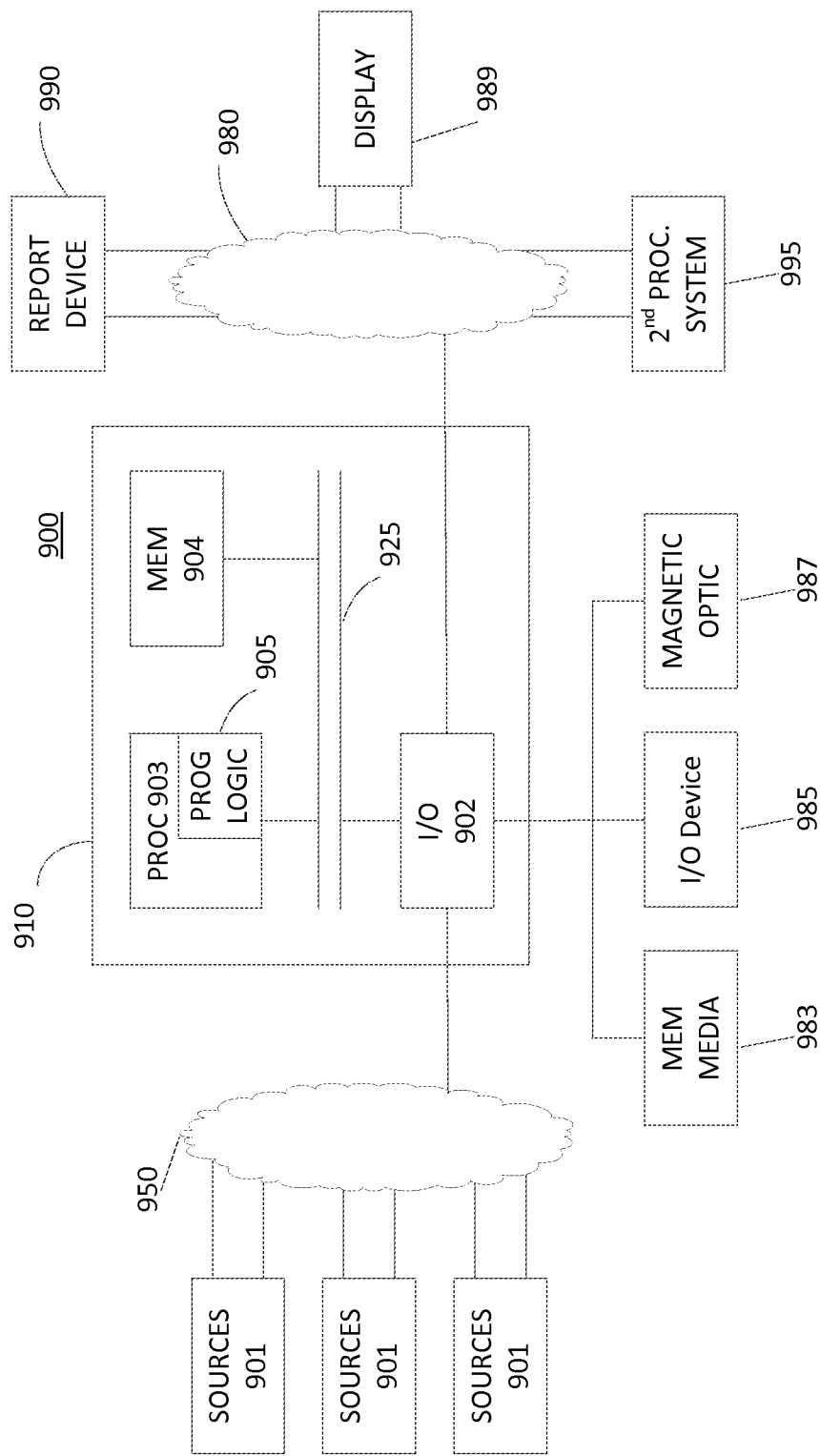
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 may include one or more I/O ports 902, a processor 903, and memory 904, all of which may be connected by an interconnect 925, such as a bus. Processor 903 may include program logic 905. The I/O port 902 may provide connectivity to memory media 983, I/O devices 985, and drives 987, such as magnetic or optical drives. When the program code is loaded into memory 904 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
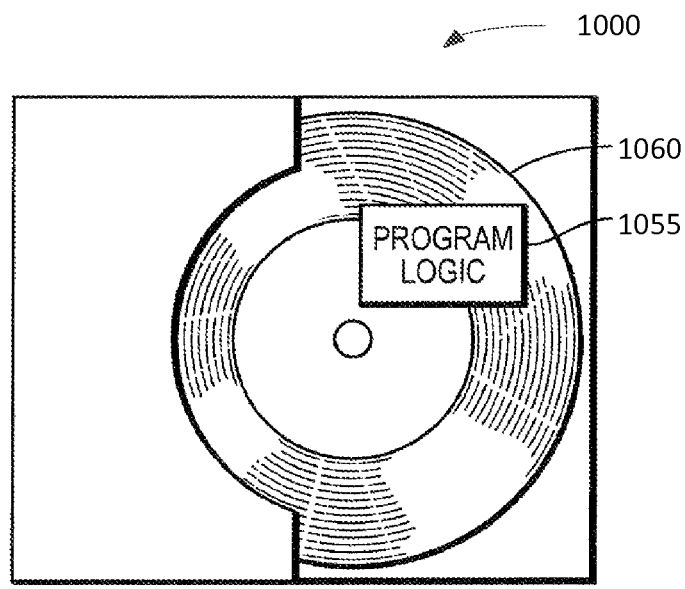
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing I/Os from an Application on a host, wherein the host is in communication with a data storage system including one or more burst buffer servers, the computer-executable method comprising:
   providing a portion of shared memory using the one or more burst buffer servers of the data storage system, wherein the portion of shared memory is enabled to be visible from each of the one or more burst buffer servers;
   each of the burst buffer servers communicating with the other burst buffer servers to enable a determination of a point of data consistency of data stored within the portion of shared memory;
   receiving, at a first burst buffer serer of the one or more burst buffer servers, a data I/O request from the application on the host, wherein the data I/O request is associated with data on the portion of shared memory;
   determining whether data associated with the data I/O request is located on the first buffer server; and
   processing the data I/O request based on the determination.

2. The computer-executable method of claim 1, wherein the data I/O request is a read I/O request.

3. The computer-executable method of claim 2, wherein the processing comprises:
   determining whether data on the portion of shared memory is consistent; and
   upon a positive determination, executing the read I/O request.

4. The computer executable method of claim 3, wherein the determining whether data on the portion of shared memory is consistent comprises:
   accessing a state of data consistency in the first burst buffer server; and
   querying each burst buffer server in the data storage system to determine whether each burst buffet server is consistent.

5. The computer-executable method of claim 1, wherein the data I/O request is a write I/O request.

6. The computer-executable method of claim 5, wherein the processing comprises:
   sending an acknowledgment message in response to the write I/O request;
   upon a determination that the write I/O request is associated with the data on the first burst buffer server, queuing the write I/O request on the first burst buffer server; and
   completing data I/O requests queued on the first burst buffer server.

7. The computer-executable method of claim 6, wherein the processing further comprises:
   upon a determination that the write I/O request is associated with a second portion of data on a second burst buffer server, forwarding the write request to the second burst buffer server.

8. A system, comprising:
a data storage system in communication with a host, wherein the data storage system includes one or more burst buffer servers; and
computer-executable program logic encoded in memory of one or more computer's in communication with the data storage system to enable management of I/Os from an Application on the host, wherein the host is in communication with the data storage system, wherein the computer-executable program logic is execution of:
providing a portion of shared memory using the one or more burst buffer servers of the data storage system, wherein the portion of shared memory is enabled to be visible from each of the one or more burst buffer servers;
each of the burst buffer servers communicating with the other burst buffer servers to enable a determination of a point of data consistency of data stored within the portion of shared memory;
receiving, at a first burst buffer server of the one or more burst buffer servers, a data I/O request from the application on the host, wherein the data I/O request is associated with data on the portion of shared memory;
determining whether data associated with the data I/O request is located on the first buffer server; and
processing the data I/O request based on the determination.

9. The system of claim 8, wherein the data I/O request is a read I/O request.

10. The system of claim 9, wherein the processing comprises:
determining whether data on the portion of shared memory is consistent; and
upon a positive determination, executing the read I/O request.

11. The system of claim 10, wherein the determining whether data on the portion of shared memory is consistent comprises:
accessing a state of data consistency in the first burst buffer server; and
querying each burst buffer server in the data storage system to determine whether each burst buffer server is consistent.

12. The system of claim 8, wherein the data I/O request is a write I/O request.

13. The system of claim 12, wherein the processing comprises:
sending, an acknowledgment message in response to the write I/O request;
upon a determination that the write I/O request is associated with the data on the first burst buffer server, queuing the write I/O request on the first burst buffer server; and
completing data I/O requests queued on the first burst buffer server.

14. The system of claim 13, wherein the processing further comprises:
upon a determination that the write I/O request is associated with a second portion of data on a second burst buffer server, forwarding the write I/O request to the second burst buffer server.

15. A computer program product for managing I/Os from an Application on a host, wherein the host is in communication with a data storage system including one or more burst buffer servers, the computer program product comprising:
a non-transitory computer readable medium encoded with computer-executable program code for using read signatures in replication, the code configured to enable the execution of:
providing a portion of shared memory, using die one or more burst buffer servers of the data storage system, wherein the portion of shared memory is enabled to be visible from each of the one or more burst buffer servers;
each of the burst buffer servers communicating with the other burst buffer servers to enable a determination of a point of data consistency of data stored within the portion of shared memory;
receiving, at a first burst buffer server of the one or more burst buffer servers, a data I/O request from the application on the host, wherein the data I/O request is associated with data on the portion of shared memory;
determining whether data associated with the data I/O request is located on the first buffer server; and
processing the data I/O request based on the determination.

16. The computer program product of claim 15, wherein the data I/O request is a read I/O request.

17. The computer program product of claim 16, wherein the processing comprises:
determining whether data on the portion of shared memory is consistent; and
upon a positive determination, executing the read I/O request.

18. The computer program product of claim 17, wherein the determining whether data on the portion of shared memory is consistent comprises:
accessing a state of data consistency in the first burst buffer server; and
querying each burst buffer server in the data storage system to determine whether each burst buffer server is consistent.

19. The computer program product of claim 15, wherein the data I/O request is a write I/O request.

20. The computer program product of claim 19, wherein the processing comprises:
sending an acknowledgment message in response to the write I/O request;
upon a determination that the write I/O request is associated with the data on the first burst buffer server, queuing the write I/O request on the first burst buffer server; and
completing data I/O requests queued on the first burst buffer server.

* * * * *